April 27, 1954
B. R. HAYHURST
2,677,100
ELECTRIC CONDUCTOR CONTINUITY TESTING APPARATUS AND METHOD
Filed Dec. 5, 1950
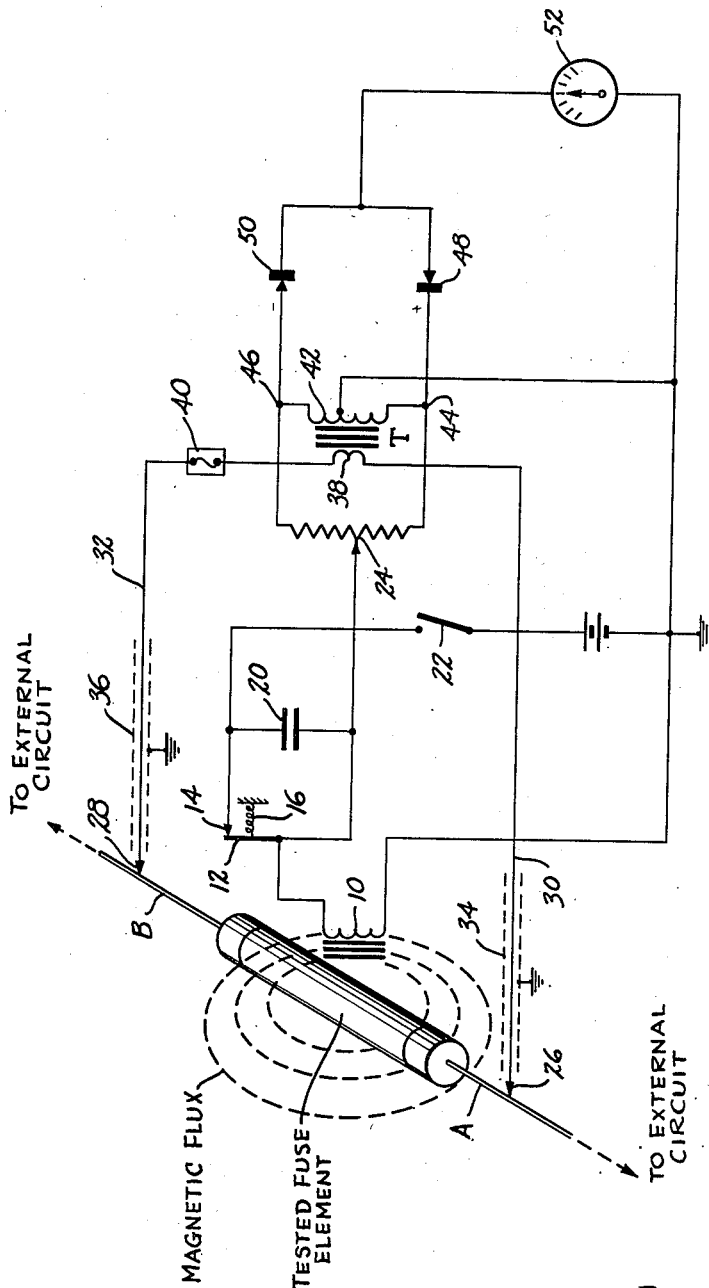
INVENTOR.
BUD R. HAYHURST
BY
ATTORNEYS Patented Apr. 27, 1954

2,677,100

UNITED STATES PATENT OFFICE 2,677,100

ELECTRIC CONDUCTOR CONTINUITY TESTING APPARATUS AND METHOD

Bud R. Hayhurst, Auburn, Wash., assignor to Boeing Airplane Company, Seattle, Wash., a corporation of Delaware Application December 5, 1950, Serial No. 199,216

8 Claims. (Cl. 324—51)

This invention relates to electric conductor continuity testing and more particularly to an improved apparatus for testing the continuity of circuit limiters, fuses, or other circuit elements or sections. The term "circuit leg" is used herein to include all such possibilities. A general object of the invention is to permit such continuity tests to be made on circuit elements or sections in situ independently of operating voltage and current conditions in the circuit in which such element or section may be incorporated, and independently of the nature or configuration of such circuit. The improved testing apparatus is herein illustratively described by reference to its presently preferred form, namely one intended for portable or field applications, such as the testing of airplane circuit fuses or the like, but it should be understood that the principles involved therein may be embodied in other and specifically different forms or variations of the example selected.

With reference to the general object stated above, it has been generally difficult in the past to make reliable tests of circuit fuse continuity, for example, with prior types of apparatus, including those dependent on resistance measurement, voltage drop resulting from test current passed through the fuse, and others, without first removing the fuse from the circuit. There are several reasons for this difficulty. The presence of a circuit path or paths in parallel with the fuse being tested might, for instance, produce a false indication of fuse continuity, when in fact the fuse was burned out. Likewise, false indications of fuse continuity might result from voltage or current conditions present in the energized circuit. In accordance with the present invention reliable continuity tests of a circuit element or section in situ may be made without reference to any of these conditions.

A feature of the invention is the provision of magnetic induction means energizable by pulsating or oscillating current to produce an oscillating magnetic field which links the tested element and thereby induces an alternating voltage therein. However, this induced voltage appearing in the fuse is capable of producing current in a detection circuit through suitable test probes or contacts applied to opposite sides of such fuse, only if the fuse constitutes a continuous conductor, to complete the detection circuit in which the fuse represents an alternating voltage source.

In the preferred form for portable usage the apparatus, including oscillating current source, is completely self-contained. In that case the magnetic induction means mentioned above comprises the field coil of a "buzzer," i. e. a form of intermittent self-deenergizing relay. The current pulsations produced in such coil which give rise to the oscillating test field, result from the natural oscillations of the buzzer circuit when energized by a battery or other direct voltage source.

Additional features of the invention reside in the special technique by which the presence of alternating voltage established magnetically or otherwise in a continuous conductor tested element is detected and indicated in singular fashion, that is independently of all other circuit voltages or currents which in a conventional testing device might influence the test apparatus to produce false indications. This result is achieved by use of a phase discriminating circuit, controlled by a reference voltage representing the alternating voltage of the oscillating current source, and responsive to the alternating voltage induced in a continuous fuse or other circuit element under test.

In the preferred form of discriminating circuit an impedance matching transformer primary winding is energized by current resulting from the alternating voltage induced in the tested element, and its mid-tapped secondary winding is connected in parallel paths, including rectifiers of reverse relative polarity, and a common return path, including a direct-current meter. The reference voltage is applied in like phase to opposite sides of the transformer secondary winding. The discriminating circuit functions such that only a transformer secondary winding voltage bearing a definite steady phase relation to the test voltage will produce an affirmative continuity test reading in the direct-current meter. Neither direct currents, alternating currents of a frequency differing from the test alternating current frequency, nor other voltages or currents in the circuit incorporating the tested element have any steady or misleading effect upon the continuity indicating meter.

Although in a broad sense the primary winding of the transformer, or equivalent voltage transfer means comprised in the detection circuit, may be energized by test alternating current established in the tested element by means other than the magnetic induction means mentioned above, the latter is decidedly advantageous over other or prior techniques of establishing continuity test voltage or current in a tested element because its effect on the detection circuit is singularly dependent upon continuity or lack thereof in the tested element itself and is independent of the number or nature of circuit paths in parallel with the tested element. This is true because the magnetically induced continuity-revealing voltage or current originates in the fuse itself independently of other influences or conditions. While the circuit in which the tested element is connected may draw some of this current, such a possibility does not interfere with test results because only a very slight amount of current is required to produce an indication in the test apparatus.

These and other features, objects and advantages of the improved continuity testing apparatus will become more fully evident from the following detailed description thereof by reference to the accompanying drawing, which is a schematic diagram of the preferred form of apparatus as mentioned above.

In the single figure the fuse element to be given a continuity test is so labeled, as are conductors A and B, by which such fuse element is connected in the external circuit. The form or arrangement of the external circuit incorporating such fuse element is immaterial. The condition of such external circuit with reference to energization at the time of the test is likewise immaterial.

In accordance with the invention a magnetic induction means, such as the coil 10, is positioned in close proximity to the tested element, such that magnetic flux emanating from the coil 10 links such element. For example, the effective pole axis of the field winding 10 will be disposed generally vertical if the tested fuse element as an electric conductor is horizontal. The winding 10 in the illustrated case constitutes the coil of a self-deenergizing type relay, of which the common buzzer is a well known example. The contacts 12 and 14 of this relay are normally held closed by a spring 16 to complete an energizing circuit for the coil 10 through the battery 18. One side of the coil is grounded and the other side thereof connected to the variable tap of potentiometer 24.

When the main control switch 22 of such energizing circuit is closed, a surge of current flows through the coil 10, and by magnetic attraction the switch contact arm 12 is swung away from the contact 14 against the opposition of spring 16. A condenser 20 connected between the relay contact leads minimizes arcing between such contacts. Upon such separation of the contacts 12 and 14, coil energizing current from battery 18 is interrupted, and the magnetic field produced by coil 10 which attracted the switch arm collapses and thereby permits spring 16 to close contacts 12 and 14 once again. Thereupon the coil energizing circuit is reestablished and another surge of current flows through the coil, initiating another cycle of operation. Rapidly recurring opening and closure of the contacts effected in this manner produces pulsating or oscillating current in the coil 10, and alternating voltage between ground and the variable tap of the potentiometer 24. In effect, the coil 10, the battery 18 and the contacts 12 and 14 constitute an alternating voltage or current supply source, providing a control or reference voltage for the phase discriminating circuit to be described, of which the potentiometer 24 is a part.

The frequency of this source depends upon the circuit constants and magnetic and mechanical characteristics of the particular relay device selected. Ordinarily this frequency will be some arbitrary value different from and unrelated to any of the standard circuit frequencies or those likely to be encountered in circuits to be tested. This and the fact that the buzzer frequency may tend to drift somewhat insures that no accidental synchronism or constant phase relation will exist between the buzzer current as the phase discriminator circuit reference standard, and currents otherwise existing in the circuit under test, to produce false continuity indications.

The recurring alternate generation and collapse of magnetic flux linking the tested fuse element during oscillation in the coil energizing circuit induces a detectable alternating voltage in such element, which voltage appears between the conductors A and B, only if the tested element itself forms a continuous conductor. Detection of such voltage is accomplished by applying contacts 26 and 28 to the conductors A and B or in general to opposite sides of the tested element, such contacts extending through leads 30 and 32 to opposite sides of the primary winding 38 of transformer T. A protective fuse 40 is interposed in one of these leads as a protection against high voltage existing in the circuit under test. Grounded shields 34 and 36 surround the leads 30 and 32. If the tested fuse element is continuous alternating current flows in the transformer primary winding 38, bearing a definite phase relation to the reference voltage applied to potentiometer 24.

The secondary winding 42 of transformer T has a grounded center tap and its opposite or outer terminals 44 and 46 are connected to corresponding opposite ends of the winding of potentiometer 24, so that such terminals both assume an alternating potential with reference to ground, established by the alternating voltage developed in coil 10.

The potential of terminal 46 is applied to the cathode of selenium rectifier 50 and that of terminal 44 to the anode of selenium rectifier 48, that is, in a reverse polarity arrangement of the rectifiers. The anode of rectifier 50 and the cathode of rectifier 48 are then interconnected and a direct current meter 52 is connected between their junction and ground, as shown. The resulting detector circuit constitutes a phase discrimination circuit, which, in the example, employing a micro-ammeter 52 and an impedance matching transformer T having a very low impedance primary winding and a high step-up turns ratio, avoids need for power amplification. inherent circuit unbalances due to unavoidable differences in parts which correspond, such as rectifiers 48 and 50, may be compensated by displacing the variable tap of potentiometer 24 to either side of the neutral position as may be necessary to obtain a zero reading on the meter 52 when the contacts 26, 28 are removed from circuit conductors A and B.

In the operation of the test apparatus the coil 10 is positioned next to the tested fuse element so that the oscillating coil flux links such element and induces therein an alternating voltage. The contacts 26 and 28 are then engaged with opposite sides of the tested fuse element, so that the alternating voltage induced therein causes an alternating current to flow through the primary winding 38 of transformer T. Alternating voltage of opposite relative phase is thereby induced in the two halves of the transformer secondary winding 42. A reference alternating voltage representing the voltage of coil 10 is applied to terminals 44 and 46 relative to ground. This latter voltage is in phase with the alternating voltage induced in one half of the transformer secondary winding and 180 degrees out of phase with reference to that induced in the other half of such secondary winding. Consequently, the voltage applied to the meter 52 in series with one rectifier, 48 or 50, is the sum of the two voltages mentioned, whereas that applied to the meter and the other rectifier is the difference of such voltages. The pulsating direct current then flowing through the meter in one direction, on one half cycle, is greater than that flowing reversely through the meter on the other half cycle of operation. As a result, an average direct current flows through the meter in one direction and produces a needle deflection which indicates the existence of continuity in the tested fuse element.

Should the tested fuse element be blown out or otherwise defective, so that it does not form a continuous conductor between contacts 26 and 28, the only voltage applied to the selenium rectifiers 48 and 50 will be the reference voltage appearing at terminals 44 and 46. Under this condition the average current flowing through the meter 52 is zero if the circuit is properly balanced by adjustment of potentiometer 24.

While the invention has been described in connection with the testing of fuse elements, it will be appreciated that the same principles may be employed for testing other circuit elements or sections.

I claim as my invention:

1. Electric conductor continuity testing apparatus for testing in situ a leg of an electric circuit independently of the remainder of such circuit, comprising magnetic induction means energizable by oscillating current and operable to produce a periodically varying magnetic field localized substantially only in the circuit leg under test magnetically linked with such induction means and thereby induce alternating voltage in such leg, a pair of contacts spaced apart to engage opposite sides of the tested leg conductively at locations substantially outside the field, and means connected electrically between said contacts to indicate the presence of such induced alternating voltage therebetween revealing electrical continuity of the circuit leg being tested.

2. Apparatus defined in claim 1, and an independent oscillator connected to energize the magnetic induction means.

3. Electric conductor continuity testing apparatus for testing in situ a leg of an electric circuit, comprising alternating current supply means independent of such circuit and any alternating voltage source thereof, magnetic induction means energizable by said supply means and adapted to be magnetically linked substantially exclusively with the circuit leg under test to establish alternating voltage and current therein when said leg forms a continuous conductor, probe means positioned to contact said circuit leg at spaced-apart locations thereon outside the effective portion of the magnetic field and operable to detect potential difference across the circuit leg, and phase discriminating means controlled by said alternating current supply means and responsive to voltage from said probe means to indicate the presence singularly of such voltage induced in the circuit leg, and thereby revealing electrical continuity of such leg.

4. Electric conductor continuity testing apparatus defined in claim 3, wherein the magnetic induction means comprises magnetic field winding means, and the oscillating current supply means comprises the inductance winding of such winding means, a source of direct current connected in circuit with such inductance winding for energization thereof, and normally closed circuit interrupting switch means having contacts interposed in such circuit and having spring-biased magnetically controlled actuating means cooperating magnetically with said winding means to open said switch means and interrupt energization of said winding means by such energization thereof, producing oscillation of said switch means hence intermittent interruption of current in said winding means, the inductive reactance of said winding means thereby producing alternating voltage therein, representing the voltage of the oscillating current supply means.

5. Electric conductor continuity testing apparatus defined in claim 4, wherein the phase discriminating means comprises direct-current indicator means, a pair of rectifiers each having anode and cathode, the anode of the first and the cathode of the second of said rectifiers being connected to one side of said indicator means, a first transfer circuit means applying alternating voltage, corresponding to the induced alternating voltage in the circuit leg under test, between the opposite side of said indicator means and the cathode of the said first rectifier, a second transfer circuit means applying alternating voltage, corresponding to such induced alternating voltage, but of opposite relative phase, between the said opposite side of said indicator means and the anode of said second rectifier, and a third transfer circuit means applying alternating voltage, corresponding to the alternating voltage of the oscillating current supply means, between the said opposite side of said indicator means and each the cathode of said first rectifier and the anode of said second rectifier, producing flow of direct current in said indicator means when such induced alternating voltage exists.

6. Electric conductor continuity testing apparatus defined in claim 3, wherein the phase discriminating means comprises direct-current indicator means, a pair of rectifiers each having anode and cathode, the anode of the first and the cathode of the second of said rectifiers being connected to one side of said indicator means, a first transfer circuit means applying alternating voltage, corresponding to the established alternating voltage in the conductor element, between the opposite side of said indicator means and the cathode of the said first rectifier, a second transfer circuit means applying alternating voltage, corresponding to such established alternating voltage, but of opposite relative phase, between the said opposite side of said indicator means and the anode of said second rectifier, and a third transfer circuit means applying alternating voltage, corresponding to the alternating voltage of the oscillating current supply means, between the said opposite side of said indicator means and each the cathode of said first rectifier and the anode of said second rectifier, producing flow of direct current in said indicator means when such established alternating voltage and current exist.

7. The method of testing continuity of an electrical circuit leg in situ independently of the nature and condition of the remainder of the circuit, comprising the steps of setting up a test oscillating magnetic field, causing said field to link said circuit leg in a general plane substantially normal to at least a portion of said leg without appreciably linking the remainder of the electrical circuit connected thereto, causing the oscillating field frequency to differ from the frequency of any voltages existing in the electrical circuit during the test, and indicating the continuity of such circuit leg by detecting the oscillating difference of potential induced in said circuit leg between points located on opposite sides of said plane by said oscillating magnetic field when said circuit leg constitutes an unbroken electrical conductor.

8. The method defined in claim 7, wherein the oscillating potential difference detected across the circuit leg under test is selected from among any other circuit voltages by comparing said potential difference with an oscillating reference voltage of the same frequency as the oscillating field and bearing a constant phase relationship therewith.

References Cited in the file of this patent

UNITED STATES PATENTS

| Number | Name | Date |
|---|---|---|
| Re. 21,853 | Atkinson et al. | July 15, 1941 |
| 1,526,391 | Stewart | Feb. 17, 1925 |
| 1,957,477 | Sharp et al. | May 8, 1934 |
| 2,092,951 | Blake | Sept. 14, 1937 |
| 2,124,578 | Knerr et al. | July 26, 1938 |
| 2,186,826 | Edgar | Jan. 9, 1940 |
| 2,241,915 | Kramar | May 13, 1941 |
| 2,508,478 | Uehling | May 23, 1950 |